United States Patent [19]

Everett

[11] 4,440,202
[45] Apr. 3, 1984

[54] TREE DELIMBER

[76] Inventor: Colvin K. Everett, 701 Terral Island Rd., Farmerville, La. 71241

[21] Appl. No.: 466,129

[22] Filed: Feb. 14, 1983

[51] Int. Cl.³ .......................... A01G 23/08; B27L 1/00
[52] U.S. Cl. ..................................... 144/2 Z; 144/343
[58] Field of Search ........................ 144/2 Z, 3 D, 343

[56] References Cited

U.S. PATENT DOCUMENTS

| | | | |
|---|---|---|---|
| 3,805,858 | 4/1974 | Morin | 144/2 Z |
| 3,868,981 | 3/1975 | Nadeau | 144/2 Z |
| 3,881,532 | 5/1975 | Jouppi | 144/2 Z |
| 3,948,299 | 4/1976 | Laforge et al. | 144/2 Z |
| 4,067,367 | 1/1978 | Adamson | 144/2 Z |
| 4,147,190 | 4/1979 | Nadeau | 144/2 Z |
| 4,371,016 | 1/1983 | Bradshaw | 144/2 Z |

Primary Examiner—W. D. Bray
Attorney, Agent, or Firm—C. A. Phillips; Michael L. Hoelter

[57] ABSTRACT

A tree or log delimber for delimbing several trees at one time wherein the trunk ends of the trees are abutted against a stop while a grid-like cutter is applied at their opposite ends. This cutter is longitudinally moved around and along the trees toward the trunk ends of the trees, thereby slicing off tree limbs.

6 Claims, 8 Drawing Figures

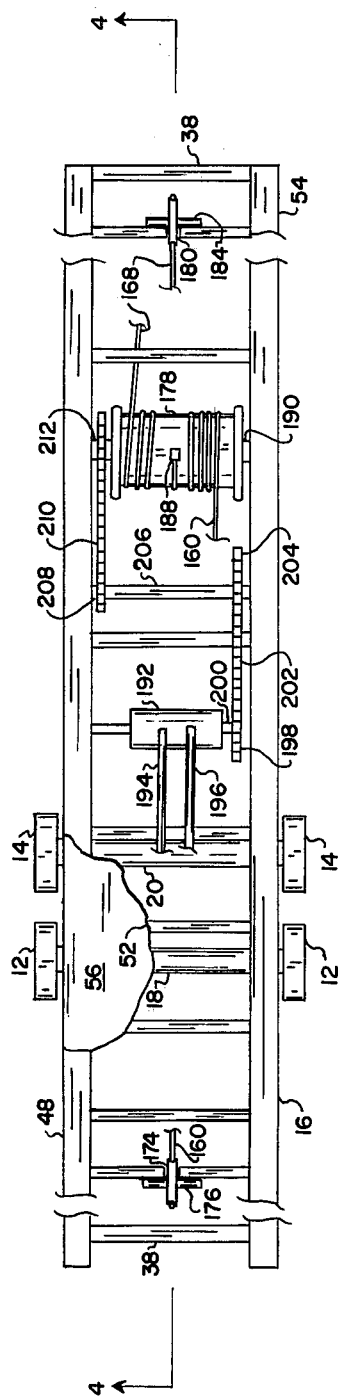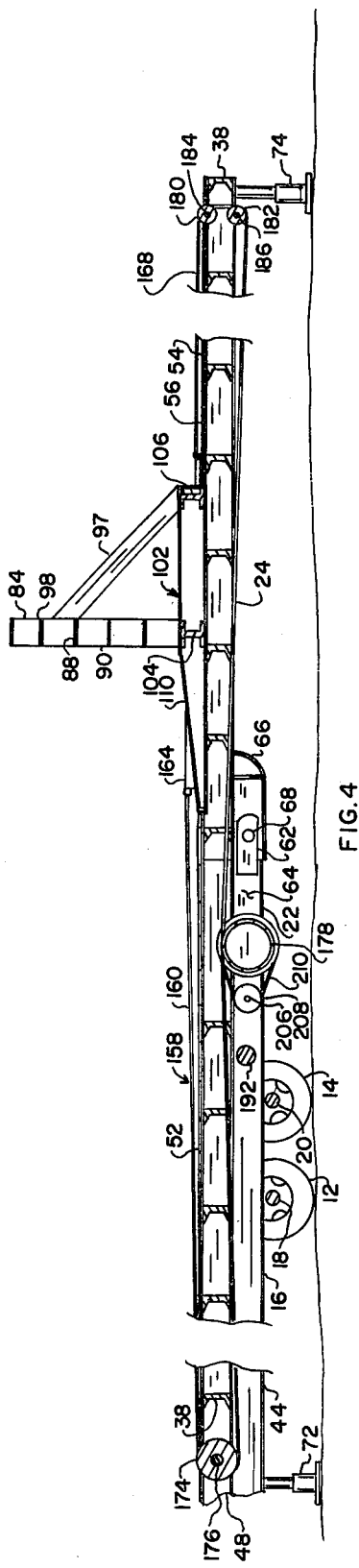

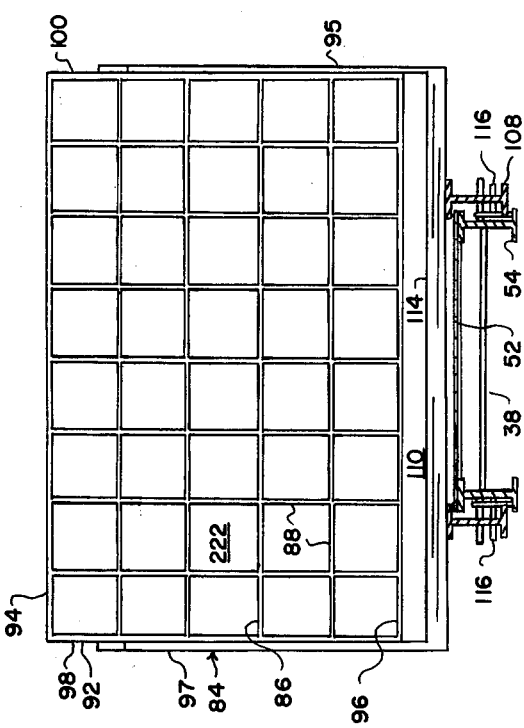
FIG. 5
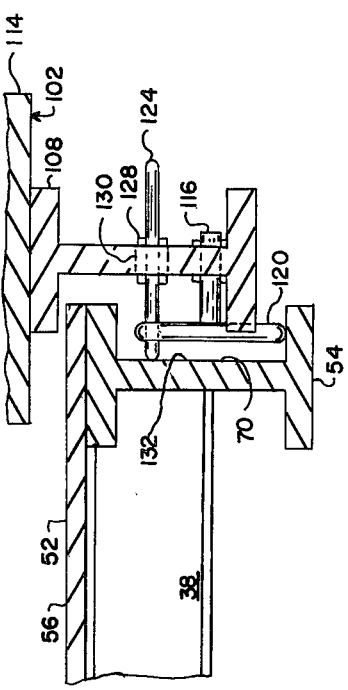
FIG. 6
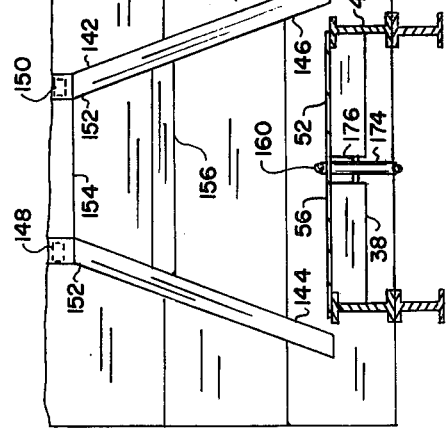
FIG. 7
FIG. 8

TREE DELIMBER

TECHNICAL FIELD

This invention relates generally to tree harvesting, and more particularly to an improved delimbing system.

BACKGROUND ART

In the past, felled trees or logs have been individually delimbed by workmen yielding chainsaws. This method of delimbing was and still is highly dangerous because of the hazards of working with these saws upon uneven terrain in a physically demanding environment. Recently, in response to the inherent dangers of this method of delimbing trees, machines have appeared which will delimb trees. Of those known to the applicant, they are only capable of delimbing one tree at a time. Since typically trees are cut by a crew of men or several crews, and the rate of cutting may be quite high, a single tree delimber is often insufficient, and thus either several delimbers are required, or bottlenecks occur. Several such machines may be unusually costly, yet one or an insufficient number may severely decrease efficiency; neither selection is desirable. In addition to their single log capacity, these machines are often quite intricate and include a substantial number of sub-assemblies, which in turn add generally to maintenance requirements.

It is an object of this invention to provide a tree delimber which will delimb several trees at one time and yet one which employs few components and is simple and safe to operate.

SUMMARY OF THE INVENTION

In accordance with this invention, a tree delimber is constructed having a rectangular platform that supports an upright stop plate intermediately between a log loading assembly and a movable cutting assembly. The log loading assembly is secured to one end region of the platform, and the cutting assembly is guided by a longitudinal track, secured to the platform, which extends between the stop plate and an opposite end region of the platform. This cutting assembly is moved toward and away from the stop plate and supports an upright grid comprising an open network of interlocked horizontal and vertical cutting blades. Operating means are provided to control the log loading onto the platform and to control the movement of the cutting assembly.

BRIEF DESCRIPTION OF THE DRAWINGS

FIG. 3 is a diagrammatic top view, partially cut away, taken along line 3—3 of FIG. 2.

FIG. 4 is a sectional view, partially cut away, taken along line 4—4 of FIG. 3.

FIG. 5 is a sectional view taken along line 5—5 of FIG. 2.

FIG. 6 is an enlarged view, partially cut away, of a portion of FIG. 5.

FIG. 7 is a side view, partially cut away, showing the cutting assembly.

FIG. 8 is a sectional view taken along line 8—8 of FIG. 2.

DETAILED DESCRIPTION OF THE INVENTION

Figure 1:
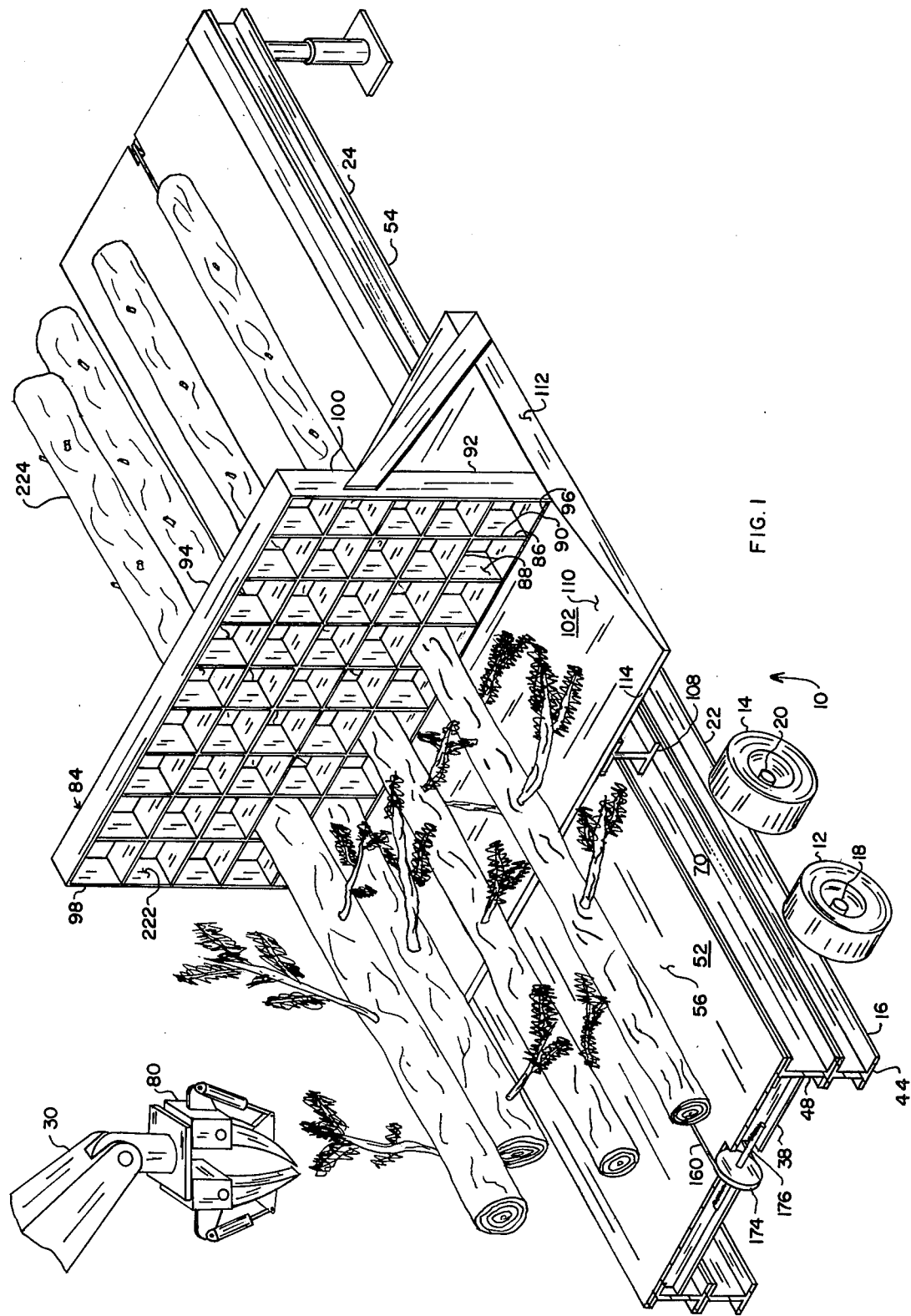
FIG. 1 is a diagrammatic view, partially cut away, of the invention.
Figure 2:
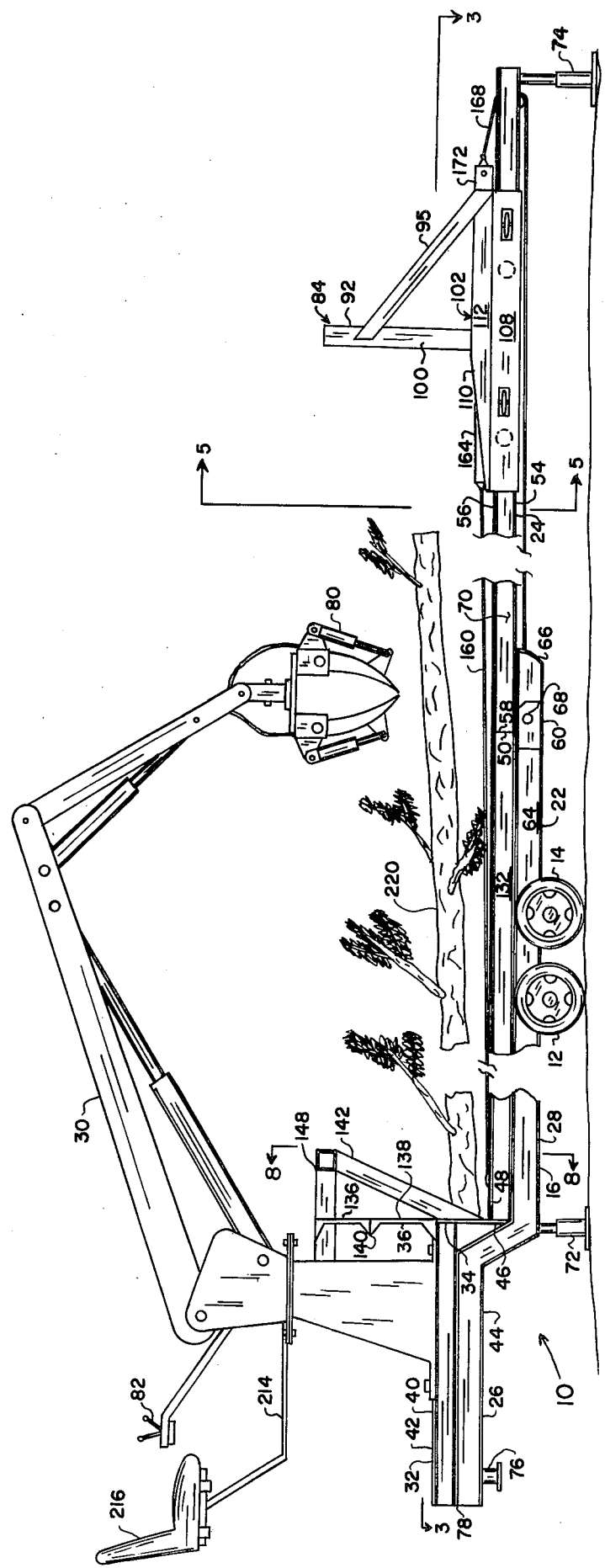
FIG. 2 is a side view, partially cut away, of the invention.

Referring to the drawings, a mobile chassis 10 is generally centrally supported on two pairs of wheels, a front pair of wheels 12 and a rear pair of like wheels 14, conventionally attached to chassis 16 and supporting it by axles 18 and 20. Chassis 16 is actually constructed in two separable sections, a main or front section 22 and a rear section 24. Rear section 24 is disconnected from front section 22 when chassis 16 is towed to a new work site. By this approach, the overall length of the chassis as towed is shortened. Main section 22 is constructed of two chassis levels, the front region 26 providing a higher level than rear region 28. Front region 26 provides a base for crane 30. Top I beams 32 extend rearward to point 34 where it terminates at log stop 36 and provides some support for log stop 36, which will be described below. Structural cross members 38 connect between top I beams 32 and together with these I beams 32 provide a support for plate 40, which in turn provides a platform floor 42 for the raised front region 26. A second lower I beam 44 on each side of chassis 16 extends rearward from front section 22 to rear section 24, having a jog downward to effect a change in elevation coordinate with a change in elevation between the front and rear regions 26 and 28 of main section 22. Commencing at front end point 46, upper I beam 48 (one on each side) extends rearward to rear end point 50 of main chassis 22, upper I beam 48 being above and welded to lower I beam 44. Cross frame members 38 extend across and attach between upper I beams 48 on opposite sides of chassis 16 and support a floor plate 52 thereon. Rear section 24 of chassis 16 is framed with a single I beam 54 on each side structurally connected with and supporting cross frame members 38. Plate 52 extends from side to side over I beams 54 and cross frame members 38 to provide a platform floor 56 for rear section 24. Front end 58 of rear section I beams 54 butt up against rear end 50 of upper I beams 48 of main section 22 of chassis 16. A pair of plates 60 and 62 are welded to opposite sides of web 64 on each of lower I beams 44 of main section 22 and a mating flange member 66 is welded to the bottom surface of I beams 54 (on opposite sides of chassis 16) of rear chassis section 24. This flange member 66 is positioned between these plates 60 and 62 which are then bolted together by one or more bolts 68. This method of connecting front and rear sections 22 and 24 of chassis 16 provides for a clear, uninterrupted track 70 extending along and between upper I beams 48 of front chassis section 22 and I beams 54 of rear chassis section 24.

Conventional adjustable pairs of jacks 72 and 74 are connected, by means not shown, to front and rear chassis sections 22 and 24 to stabilize and level the whole chassis 16 during operation. A towing hitch 76 is welded to the forward end 78 of chassis 16, this forward end 78 being configured to be coupled to a towing connection. During towing, rear section 24 would be stored on main section 22 of chassis 16, as previously discussed.

A conventional log loading crane 30 is either bolted or welded to the raised front region 26 of main section 22 of chassis 16, and it is employed to load logs onto platform 42. As shown, grappling head 80 of crane 30 is turned 90 degrees from its normal loading position simply to illustrate its configuration. Crane 30 would include conventional controls 82 to enable the swiveling of grappling head 80 to any desired orientation and to effect grappling and release functions.

As a feature of this invention, branches of previously cut trees are trimmed off by a multi-cellular cutting assembly 84 which is supported on chassis 16 such that it is movable longitudinally along chassis 16. Cutting assembly 84 is configured with an upright grid 86 consisting of an open network of vertical and horizontal cutting plates 88, each having a forward sharpened edge 90. These cutting plates 88 are supported by an exterior frame 92 having top and bottom horizontal frame members 94 and 96 and side vertical frame members 98 and 100. Cutting assembly 84 is mounted on a movable base assembly 102. Base assembly 102 employs a pair of transverse I beams 104 and 106 which are supported (welded) to side mounted I beams 108 (one on each side). Base assembly 102 is covered by a top plate 110 and side plates 112, wherein top plate 110 of base assembly 102 tapers down to a front connecting plate 114. Frame 92 is braced in its upright position upon base assembly 102 by diagonal braces 95 and 97. Braces 95 and 97 are welded between vertical frame members 98 and 100 and the rear of base assembly 102.

Each of the side mounted I beams 108 (one on each side) supports horizontal axles 116 and 118, which in turn support rollers 120 and 122 on each side of cutting assembly 84. Rollers 120 and 122 ride along track 70 on each side of chassis 16. Nonbinding engagement between track 70 and I beams 108 of base assembly 102 is effected by employing a pair of additional rollers 124 and 126 on each of the side mounted I beams 108. These rollers are supported on vertical axles 128 within openings 130 in I beams 108, and they engage a web 132 of the I beam forming track 70 to thus maintain a spacing between the chassis track 70 and the base assembly I beams 108.

A log end stop or heel plate 136 is positioned across a front region 26 of chassis 16 just against top I beams 32. This stop or heel plate 36 is formed by a pair of structural steel channels 136 and 138 welded together along their mating line 140 of contact. This stop 36 extends downward to platform 56 and is welded to the front end 46 of upper I beams 48. Stop plate 36 is further supported by bracing frame 142 made up of a pair of tubular steel members 144 and 146 which extend at an angle from platform 56 away from the upper region of channel 136. A pair of supporting tubular steel members 148 and 150 extend horizontally from the upper end regions 152 of tubular members 144 and 146 back to the upper region of channel 136. Additionally, tubular members 144 and 146 are reinforced in their positions by horizontal tubular members 154 and 156.

Cutting assembly 84 is moved longitudinally by a cable assembly 158 wherein one end of front cable 160 is connected via bracket 162 to a riser 164 on the front of top plate 110 of base assembly 102, and an end 166 of rear cable 168 is connected by bracket 170 to a plate 172 connected to the rear of base assembly 102. Front cable 160 extends forward over front pulley 174 centrally supported on shaft 176 and back underneath platform 56 to cable drum 178 where it is terminated. Rear cable 168 extends to rear pulleys 180 and 182 centrally supported on shafts 184 and 186, respectively, and passes around them and back toward cable drum 178 where it, too, is terminated. Two of these pulleys, pulleys 174 and 180, extend slightly above platform 56 which is notched to allow the pulley and cable to pass through it. Alternately, cables 160 and 168 would be a single cable, and they together would be affixed to cable drum 178, for example, at point 188. Cable drum 178 is rotatably supported by an axle 190 on chassis 16 by bearing means not shown. This cable drum 178 is reversibly driven by a reversible hydraulic motor 192 hydraulically fed through lines 194 and 196 from a control (not shown). Speed reduction, in order to increase torque, is achieved by a relatively small sprocket 198 on motor shaft 200 which drives, via chain 202, a larger sprocket 204 on shaft 206. Shaft 206 is rotatably supported on chassis 16 by means not shown.

In accordance with speed reduction principles, a small sprocket 208 is affixed to the opposite end of shaft 206, and it drives, via chain 210, a large sprocket 212 on shaft 190 upon which cable drum 178 is rotated. Accordingly, by operating motor 192 in one direction, drum 178 will rotate in a direction such as to cause cable 160 to move cutting assembly 84 to the left. Then, by reversing the direction of motor 192, cutting assembly 84 is caused to move to the right. Cutting assembly 84 and crane 30 are operated by controls 82 on control platform 214, which is secured to a front region 26 of chassis 16. Controls 82 are operated by an operator from seat 216.

To examine the operation of the system described, initially, cable drive assembly 158 would be operated such that cutting assembly 84 is moved to the far right. Then, crane 30 would be conventionally operated to seize logs which have been previously cut and stacked alongside chassis 16. One at a time these logs would be placed on chassis 16 with their trunk or large end positioned generally on the front of chassis 16 butting up against stop plate 36, as shown for log 220. Depending upon the size of the cut log, it may be necessary to actually position the top end into one of cellular openings 222 in cutting assembly 84. When this is the case, typically, the longest log would be placed on platform 56 first and cutting assembly 84 moved and the log selectively positioned until the small end just passes through one of cellular openings 222. Thereafter, the next smaller log would be so placed in the same manner, and so on. When they are all in place, grappling head 80 and crane 30 would be moved out of the way, and cutting assembly 84 would be operated to be moved to the left, and as it moves, the branches of the logs would be sliced off, as indicated by branch stubs 224 shown in FIG. 1.

When cutting assembly 84 reaches stop plate 36, it would either be stopped manually or automatically, by automatic limit controls (not shown). Thereafter, cutting assembly 84 would be moved back to the right until it clears the logs, and then crane 30 would grasp the logs and typically load them on a transport vehicle to be moved from the site.

I claim:
1. A log processor comprising:
an elongated platform, including an elongated track;
stop means, including a support attached to said platform and having a rigidly supported area region extending across said platform, for providing a stationary support against which cut logs generally lying horizontally and longitudinally on said platform are generally blocked from horizontal movement in one longitudinal direction;
cutting means, including a base movable on said track and a grid of crossed blades supported on said base and facing said area of said stop means, for receiving ends of logs between said blades and, upon relative movement between said blades and logs, for cutting limbs from the logs; and motive means coupled between said platform and said cutting means for moving said cutting means on said track toward and away from said stop means, whereby logs placed on said platform may be delimbed by said cutting means.

2. A log processor as set forth in claim 1 wherein said track comprises a pair of spaced planar regions of said platform, and said motive means includes a plurality of spaced rollers attached to said base and positioned to ride along said spaced planar regions.

3. A log processor as set forth in claim 2 wherein said motive means comprises a cable attached to and longitudinally extending from said cutting means, and said motive means includes means for applying tension to said cable for operating said cutting means along said platform.

4. A log processor as set forth in claim 3 wherein said motive means comprises:

at least one pulley positioned at each of two spaced points along said platform; and a drum and reversible motor connected to said drum for driving said drum and said cable extending over said pulleys to, and being attached to, said drum.

5. A log processor as set forth in claim 4 further comprising a log loading means, supported on one end region of said platform and including a selectively movable grappler, for grasping logs and loading them onto said platform with the cut end of the log adjacent to said stop means and in a longitudinal position between said stop means and said cutting means.

6. A log processor as set forth in claim 5 wherein said log loading means is positioned on said platform generally adjacent to said stop means.

* * * * *